US008674934B2

(12) United States Patent
Kim

(10) Patent No.: US 8,674,934 B2
(45) Date of Patent: Mar. 18, 2014

(54) MOBILE TERMINAL AND METHOD OF CONTROLLING THE SAME

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 688 days.

(21) Appl. No.: 12/541,497

(22) Filed: Aug. 14, 2009

(65) Prior Publication Data

US 2010/0056224 A1      Mar. 4, 2010

(30) Foreign Application Priority Data

Aug. 18, 2008  (KR) .................. 10-2008-0080596

(51) Int. Cl.
*G09G 5/00*            (2006.01)
(52) U.S. Cl.
USPC .............................. 345/156; 345/1.1; 345/1.3
(58) Field of Classification Search
USPC .......................................... 345/156, 1.1, 1.3
See application file for complete search history.

(56) References Cited

U.S. PATENT DOCUMENTS

| 2004/0014488 | A1* | 1/2004 | Sawayama et al. ........ 455/550.1 |
| 2005/0096082 | A1 | 5/2005 | Chang |
| 2006/0209022 | A1* | 9/2006 | Hosoda ......................... 345/156 |
| 2007/0026869 | A1 | 2/2007 | Dunko |
| 2007/0176898 | A1 | 8/2007 | Suh |
| 2007/0188450 | A1* | 8/2007 | Hernandez et al. ........... 345/158 |
| 2007/0232336 | A1 | 10/2007 | Kim et al. |

FOREIGN PATENT DOCUMENTS

| CN | 101021766 A | 8/2007 |
| GB | 2 357 684 A | 6/2001 |
| WO | WO-2006/094308 A2 | 9/2006 |

* cited by examiner

*Primary Examiner* — Alexander Eisen
*Assistant Examiner* — Mark Regn
(74) *Attorney, Agent, or Firm* — Birch, Stewart, Kolasch & Birch, LLP

(57) ABSTRACT

The present invention relates to a mobile terminal including at least two display areas and a method of controlling the same. The mobile terminal of the present invention includes at least two display areas. A user can input a control command to the mobile terminal by moving the mobile terminal or manipulating user manipulating portions included in the mobile terminal. A controller controls a display area corresponding to an input type of the control signal, from among the display areas displayed in the mobile terminal. A user can control the mobile terminal including the at least two display areas easily and simply.

10 Claims, 16 Drawing Sheets

FIG. 7
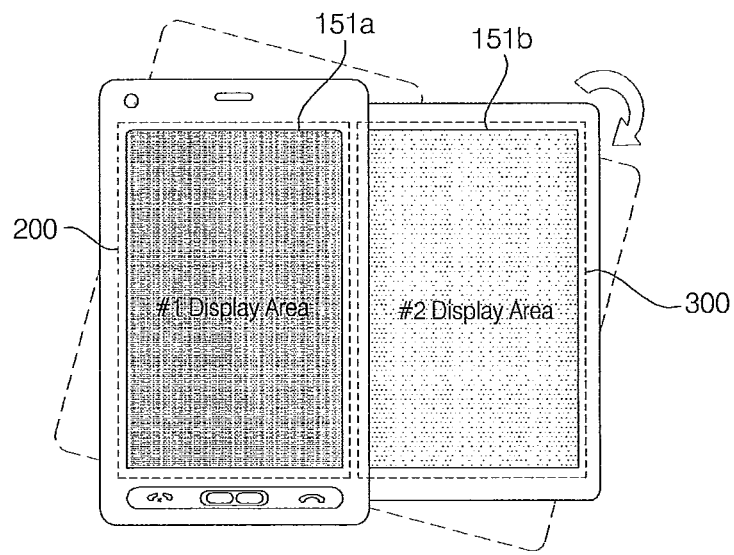
(a)
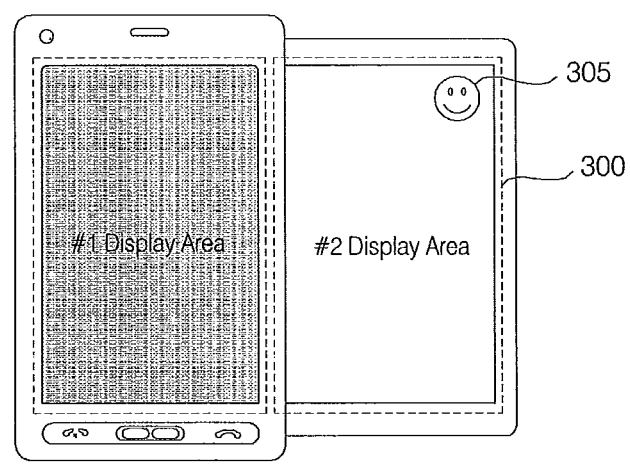
(b)

FIG. 8
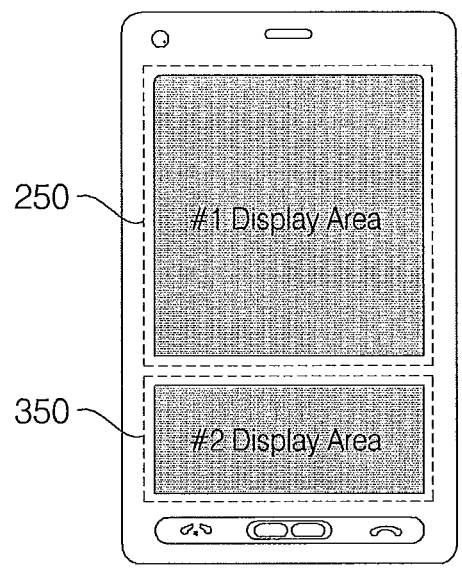
(a)
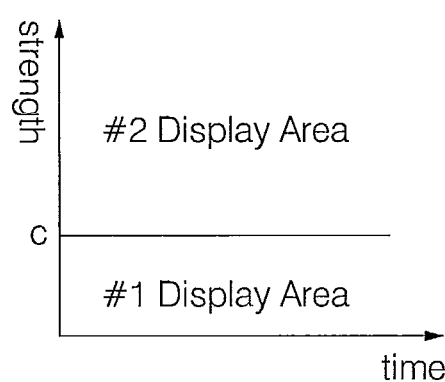
(b)

FIG. 9
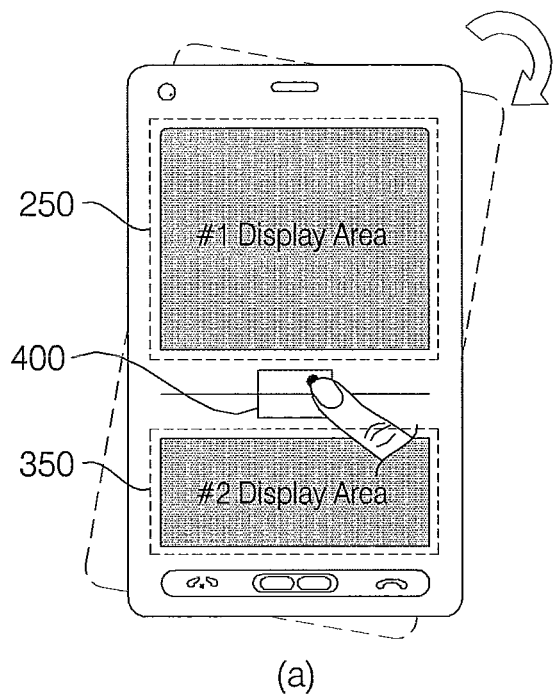
(a)
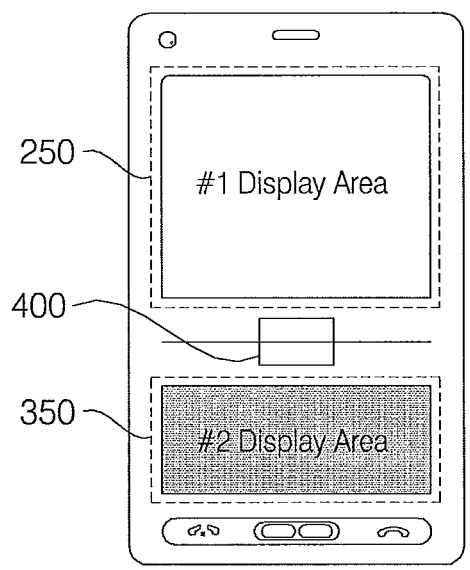
(b)

FIG. 10
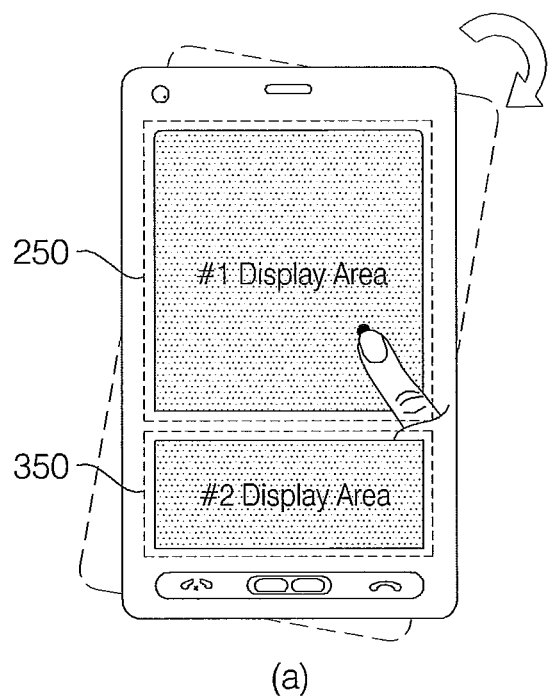
(a)
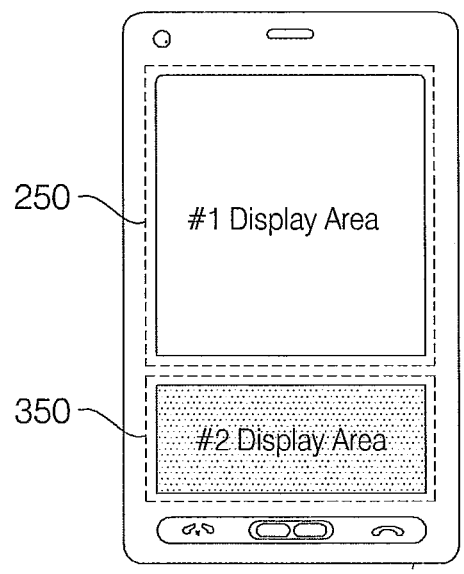
(b)

FIG. 11
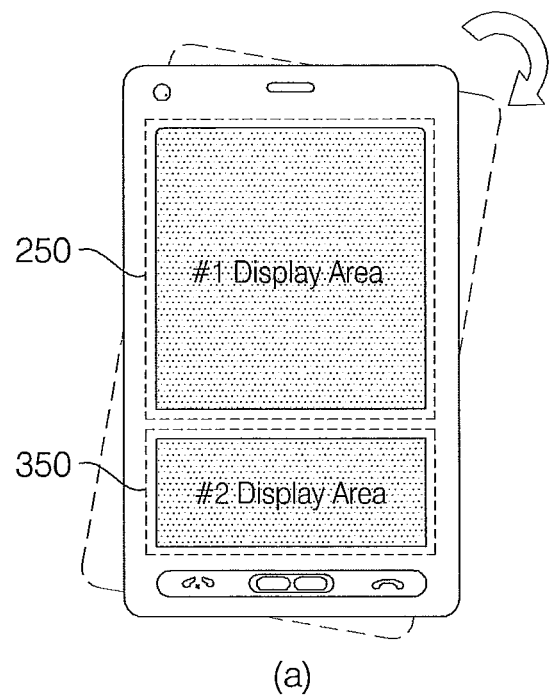
(a)
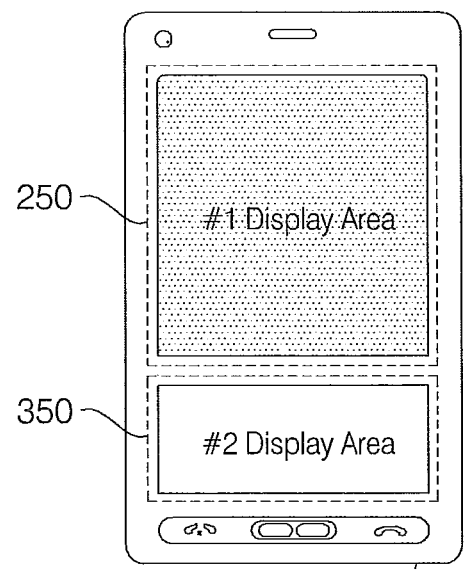
(b)

(a)          (b)

MOBILE TERMINAL AND METHOD OF CONTROLLING THE SAME

CROSS-REFERENCE TO RELATED APPLICATION

This application claims the benefit of Korean Patent Application No. 10-2008-0080596, filed on Aug. 18, 2008 in the Korean Intellectual Property Office, the disclosure of which is incorporated herein by reference.

FIELD OF THE INVENTION

The present invention relates to a mobile terminal having at least two display areas and a method of controlling the same and, more particularly, to a mobile terminal which is capable of controlling display areas using a gyro sensor, and a method of controlling the same.

BACKGROUND OF THE INVENTION

A mobile terminal is a portable device equipped with at least one of a function of performing voice and video calls, a function of inputting and outputting information, and a function of storing data. With the diversifying functions of a mobile terminal, the mobile terminal has become equipped with complicated functions, such as capturing of photos or motion pictures, playback of music files or motion picture files, game, reception of broadcasting, and wireless Internet, and is being implemented in the form of a comprehensive multimedia player.

In order to implement complicated functions, new efforts are being made on the mobile terminal having the multimedia player in the hardware or software aspect. An example of one of the efforts may include a user interface environment for enabling a user to search for or select a function conveniently. Further, as the mobile terminal is being considered as one of personal belongings used to express a user's personality, various changes in the design, such as a double-sided liquid crystal display (LCD) or a full touch screen, are also being required.

However, when considering mobility, portability, etc., a mobile terminal has a limited space for user interfaces, such as a display and a keypad. In order to efficiently use a variety of functions provided by a mobile terminal, there is a need to control the operation of the mobile terminal using a new input/output method instead of the existing complicated menu method.

SUMMARY OF THE INVENTION

It is, therefore, an object of the present invention to provide a mobile terminal including at least two display areas and a method of controlling the mobile terminal, wherein one of the at least two display areas is automatically controlled according to a type of a control signal.

Another object of the present invention is to provide a mobile terminal which can be controlled in response to its motion and a method of controlling the mobile terminal.

In accordance with an aspect of the present invention, there is provided a method of controlling a mobile terminal including at least two display areas, comprising determining whether a gyro signal is generated by a gyro sensor, if, as a result of the determination, the gyro signal is determined to have been generated, detecting a movement type of the mobile terminal, and selecting a display area corresponding to the detected movement type, from among the at least two display areas.

In accordance with another aspect of the present invention, there is provided a mobile terminal including at least two display areas, comprising at least two display areas, a gyro sensor, and a controller for, when the gyro sensor generates a gyro signal, detecting a movement type of the mobile terminal and selecting a display area corresponding to the detected movement type, from among the at least two display areas.

In accordance with yet another aspect of the present invention, there is provided a processor-readable recording medium in which a program for executing the method in a processor is recorded.

BRIEF DESCRIPTION OF THE DRAWINGS

The above and other objects and features of the present invention will become apparent from the following description of some embodiments given in conjunction with the accompanying drawings, in which:

FIG. 7 is a diagram showing an example in which an indicator icon is displayed in a selected display area or a display state of the selected displayed area is changed in response to the motion of the motion terminal according to the present invention;

FIG. 8 is a diagram showing an example in which one of two display areas is selected in response to a movement strength applied to the mobile terminal of the present invention;

FIGS. 9 to 11 are diagrams showing examples in which one of two display areas is selected or controlled in response to the manipulation of a touch screen;

DETAILED DESCRIPTION OF EMBODIMENTS

Hereinafter, some embodiments of the present invention are described in detail with reference to the accompanying drawings.

It is to be noted that a mobile terminal described in this specification may include a mobile phone, a smart phone, a notebook computer, a terminal for digital broadcasting, a personal digital assistant (PDA), a portable multimedia player (PMP), a navigator for GPS and so on.

Figure 1:
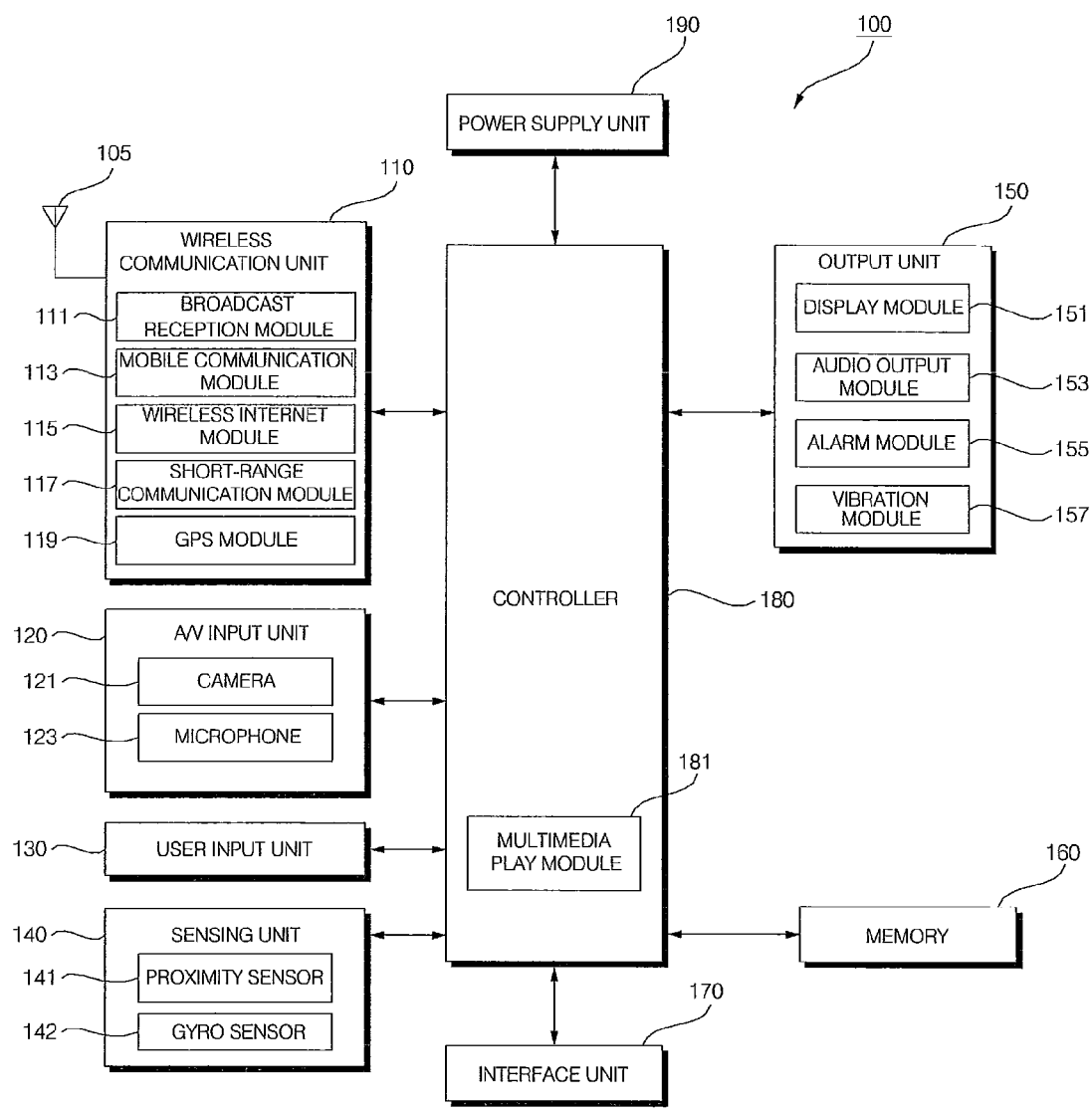
FIG. 1 is a block diagram of a mobile terminal in accordance with an embodiment of the present invention.

FIG. 1 is a block diagram of the mobile terminal in accordance with an embodiment of the present invention. From a viewpoint of constituent elements according to their functions, the mobile terminal according to the embodiment of the present invention is described below with reference to FIG. 1.

Referring to FIG. 1, the mobile terminal 100 according to the embodiment of the present invention may include a wireless communication unit 110, an audio/video (A/V) input unit 120, a user input unit 130, a sensing unit 140, an output unit 150, memory 160, an interface unit 170, a controller 180, and a power supply unit 190. In the case where the above constituent elements are practically implemented, two or more of the constituent elements may be combined into one constituent element or any one of the constituent elements may be divided into two or more constituent elements, if appropriate.

The wireless communication unit 110 may include a broadcasting reception module 111, a mobile communication module 113, a wireless Internet module 115, a short-range communication module 117, and a global positioning system (GPS) module 119.

The broadcasting reception module 111 receives at least one of broadcasting signals and broadcasting-associated information from an external broadcasting management server through broadcasting channels. The broadcasting channels may include satellite channels, terrestrial wave channels and so on. The broadcasting management server may refer to a server for creating and transmitting at least one of broadcasting signals and broadcasting-associated information or a sever for receiving at least one of previously generated broadcasting signals and previously generated broadcasting-associated information and transmitting it to the terminal.

The broadcasting-associated information may refer to information pertinent to broadcasting channels, broadcasting programs or broadcasting service providers. The broadcasting signals may include not only TV broadcasting signals, radio broadcasting signals, and data broadcasting signals, but broadcasting signals in which TV broadcasting signals or radio broadcasting signals are combined with data broadcasting signals. The broadcasting-associated information may be provided over a mobile communication network. In this case, the broadcasting-associated information may be received by the mobile communication module 113. The broadcasting-associated information may exist in various forms. The broadcasting-associated information may exist in the form of, for example, the electronic program guide (EPG) of digital multimedia broadcasting (DMB) or the electronic service guide (ESG) of digital video broadcast-handheld (DVB-H).

The broadcasting reception module 111 receives broadcasting signals using various broadcasting systems. In particular, the broadcasting reception module 111 can receive digital broadcasting signals using a digital broadcasting system, such as digital multimedia broadcasting-terrestrial (DMB-T), digital multimedia broadcasting-satellite (DMB-S), media forward link only (MediaFLO), digital video broadcast-handheld (DVB-H), or integrated services digital broadcast-terrestrial (ISDB-T). The broadcasting reception module 111 may be constructed to be suitable for not only the digital broadcasting systems, but all broadcasting systems that provide broadcasting signals. Broadcasting signals or broadcasting-associated information or both which are received through the broadcasting reception module 111 may be stored in the memory 160.

The mobile communication module 113 transmits or receives radio signals to or from at least one of a base station, an external terminal, and a server over a mobile communication network. Here, the radio signals may include voice call signals, video call signals, or various forms of data according to the transmission/reception of text/multimedia messages.

The wireless Internet module 115 refers to a module for accessing the wireless Internet. The wireless Internet module 115 may be embedded in the mobile terminal 100 or may be external to the mobile terminal 100. The short-range communication module 117 refers to a module for short-range communication. Bluetooth, radio frequency identification (RFID), infrared data association (IrDA), ultra-wideband (UWB), or ZigBee may be used for short-range communication technology. The GPS module 119 receives position information from a plurality of GPS satellites.

The A/V input unit 120 is configured to receive audio signals or video signals and may include a camera 121 and a microphone 123. The camera 121 processes picture frames, such as still images or motion pictures, which are captured by an image sensor in the video call mode or the capturing mode. The processed picture frames may be displayed on a display module 151.

The picture frames processed by the camera 121 may be stored in the memory 160 or may be transmitted to the outside through the wireless communication unit 110. It is to be noted that two or more cameras 121 may be included in the mobile terminal according to the configuration of a terminal.

The microphone 123 receives external sound signals in the call mode, the recording mode, or the voice recognition mode and processes the received sound signals into electrical voice data. In the call mode, the processed voice data may be converted into a format which can be transmitted to a mobile communication base station via the mobile communication module 113. A variety of noise removal algorithms for removing noise occurring in a process of receiving external sound signals may be used in the microphone 123.

The user input unit 130 generates key entry data which is input by a user so as to control the operation of the terminal. The user input unit 130 may include a keypad, a dome switch, a touch pad (static pressure/capacitance), a jog wheel, a jog switch, a finger mouse or the like. In particular, a structure in which a touch pad and the display module 151 are mutually layered may be referred to as a touch screen.

The sensing unit 140 detects a current state of the mobile terminal 100, such as the closed configuration of the mobile terminal 100, the position of the mobile terminal 100, or whether a user has touched the mobile terminal 100, and generates a sensing signal for controlling the operation of the mobile terminal 100. For example, in the case where the mobile terminal 100 is a slide phone type, the sensing unit 140 may be configured to detect whether the slide phone is opened. The sensing unit 140 may also have a function of detecting whether the power supply unit 190 supplies power or a function of detecting whether the interface unit 170 is coupled to external devices.

The sensing unit 140 may include a proximity sensor 141. The proximity sensor 141 may detect an approaching object or whether objects exist nearby without mechanical contact with them. The proximity sensor 141 may detect nearby objects using a change in the AC magnetic field, a change in the static magnetic field, or the ratio of a change in the capacitance. It is to be noted that two or more proximity sensors 141 may be included in the mobile terminal according to the configuration of a terminal.

The sensing unit 140 may include a gyro sensor 142. The gyro sensor 142 is a concept of sensor which includes a sensor configured to detect the motion of an object using a gyroscope, an inertial sensor, and an acceleration sensor. A gyroscope includes a mechanical gyroscope, a ring laser gyroscope, an optical fiber gyroscope and so on. The gyro sensor 142 detects the motion of the mobile terminal 100 and provides a signal for controlling the mobile terminal.

The output unit 150 is configured to output audio signals, video signals, or alarm signals, and it may include the display module 151, an audio output module 153, an alarm module 155, and a vibration module 157.

The display module 151 displays information processed by the mobile terminal 100. For example, when the mobile terminal 100 is in the call mode, the display module 151 displays a user interface (UI) or a graphic user interface (GUI) which is pertinent to a call. Further, when the mobile terminal 100 is in the video call mode or the capturing mode, the display module 151 may display captured or received images separately or simultaneously and also displays a UI or a GUI.

Meanwhile, in the case where, as described above, the display module 151 and the touch pad constitutes a touch screen through a mutually layered structure, the display module 151 may also be used as an input device as well as an output device. In the case where the display module 151 is composed of a touch screen, it may include a touch screen panel, a touch screen panel controller, etc. In this case, the touch screen panel is an externally attached transparent panel and can be coupled to the internal bus of the mobile terminal 100. The touch screen panel is configured to keep monitoring whether there is touch and, when a touch input occurs, to send corresponding signals to the touch screen panel controller. The touch screen panel controller processes the corresponding signals and sends the processed data to the controller 180. Thus, the controller 180 can determine whether there has been a touch input or which area of the touch screen has been touched.

Further, the display module 151 may include at least one of a liquid crystal display, a thin film transistor liquid crystal display, an organic light-emitting diode, a flexible display, and a 3D display. It is to be noted that two or more display module 151 may be included in the mobile terminal 100 according to the configuration of a terminal. For example, the mobile terminal 100 may be equipped with both an external display (not shown) and an internal display (not shown).

The audio output module 153 outputs audio data which is received from the wireless communication unit 110 in the incoming call mode, the call mode, the recording mode, the voice recognition mode, or the broadcasting receiving mode or is stored in the memory 160. Further, the audio output module 153 outputs sound signals which are pertinent to functions performed by the mobile terminal 100, such as sounds of an incoming call signal or sounds of a received message. The audio output module 153 may include a speaker or a buzzer.

The alarm module 155 outputs signals to inform events occurring in the mobile terminal 100. The events occurring in the mobile terminal 100 may include, for example, an incoming call signal, a received message, and an entered key signal. Further, the alarm module 155 may output signals for informing the occurrence of events in different forms from the audio or video signals. For example, the alarm module 155 may be configured to output signals in a vibration form. When a call signal or a message is received, the alarm module 155 may output a signal for informing such reception. When a key signal is received, the alarm module 155 may output a signal as a feedback to the key signal input. A user can recognize the occurrence of an event through a signal output from the alarm module 155. A signal for informing the occurrence of an event may also be output through the display module 151 or the audio output module 153.

The vibration module 157 may generate vibration with a variety of intensities and patterns in response to a vibration signal transmitted by the controller 180. The strength, pattern, frequency, movement direction, movement velocity, etc. of vibration which is generated by the vibration module 157 may be set in response to a vibration signal. It is to be noted that two or more vibration modules 157 may be included according to the configuration of a terminal.

The memory 160 may store programs for the processing and control of the controller 180 and may also perform a function of temporarily storing input or output data (e.g., a phonebook, messages, still images, and motion pictures).

The memory 160 may include at least one of storage media, including a flash memory type, a hard disk type, a multimedia card micro type, card-type memory (e.g., SD memory or XD memory), RAM, and ROM. Further, the mobile terminal 100 may operate a web storage which performs the storage function of the memory 160 on the Internet.

The interface unit 170 functions as an interface with all external devices connected to the mobile terminal 100. The external devices connected to the mobile terminal 100 may include, for example, a wired/wireless headset, an external charger, wired/wireless data ports, a memory card, a card socket such as a subscriber identification module (SIM) and a user identity module (UIM) card, an audio input/output (I/O) terminal, a video I/O terminal, and an earphone. The interface unit 170 may receive data or electric power from the external devices, transfer it to each constituent element of the mobile terminal 100, and transmit data within the mobile terminal 100 to the external devices.

The controller 180 controls the operation of each of the elements and controls an overall operation of the mobile terminal 100. For example, the controller 180 may perform pertinent controls and processing for voice call, data communication, video telephony and so on. The controller 180 may include a multimedia play module 181 for multimedia playback. The multimedia play module 181 may be configured in hardware within the controller 180 or may be configured in software separately from the controller 180.

The power supply unit 190 is supplied with external or internal power source and is configured to supply the power source for the operation of each constituent element under the control of the controller 180.

The mobile terminal according to the embodiment of the present invention has been described above in the element aspect according to its function. The mobile terminal according to the embodiment of the present invention is described below with reference to FIGS. 2 and 3 from a viewpoint of the constituent element according to its external form. Hereinafter, a sliding type mobile terminal equipped with a full touch screen, from among several types of mobile terminals such as a folder type, a bar type, a swing type, and a sliding type, is described as an example. It is however to be noted that the present invention is not limited to the sliding type mobile terminal, but instead can be applied to all types of mobile terminals including the above types.

Figure 2:
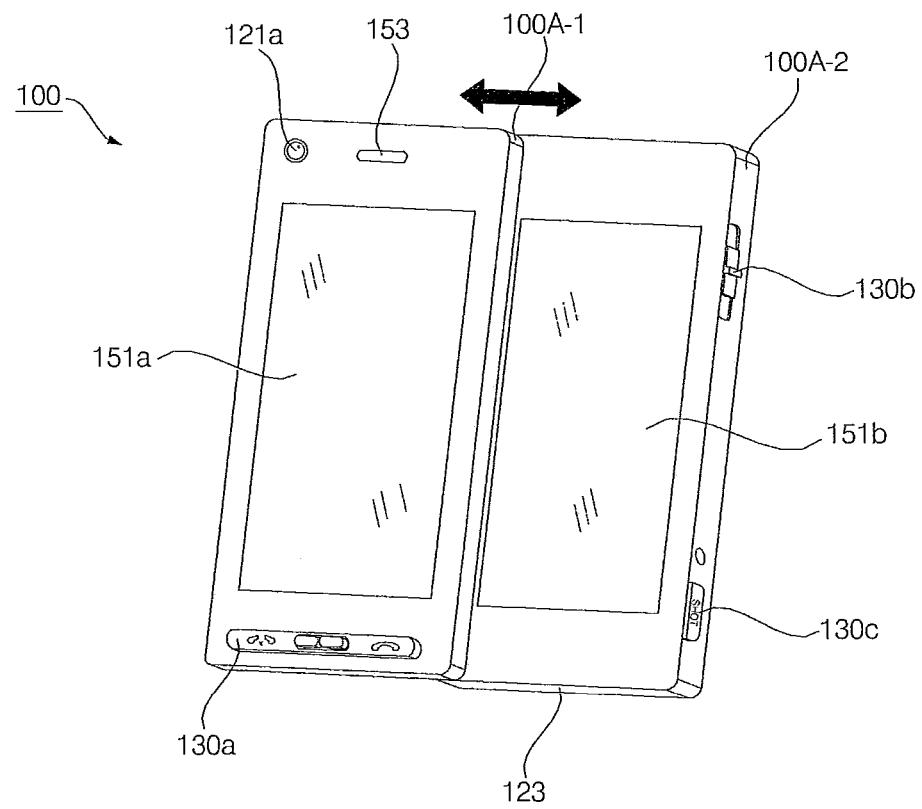
FIG. 2 is a front perspective view of the mobile terminal in accordance with the embodiment of the present invention.

FIG. 2 is a front perspective view of the mobile terminal in accordance with the embodiment of the present invention. Referring to FIG. 2, a casing which forms the exterior of the mobile terminal 100 is formed of a front casing 100A-1 and a rear casing 100A-2. A variety of electronic components are embedded in the space formed by the front casing 100A-1 and the rear casing 100A-2. At least one intermediate casing may be further disposed between the front casing 100A-1 and the rear casing 100A-2. The casings may be formed by injecting synthetic resin or may be formed from a metallic material, such as stainless steel (STS) or titanium (Ti).

The display module 151, a audio output module 153, a first camera 121a, and a first user input unit 130a may be disposed in the main body of the mobile terminal 100 (more particularly, the front casing 100A-1). A second user input unit 130b, a third user input unit 130c, and the microphone 123 may be disposed on one of the sides of the rear casing 100A-2.

The display module 151 includes a liquid crystal display or an organic light-emitting diode for visually displaying information. The display module 151 may be configured to overlap with a touch pad in the layered structure, and so operates as a touch screen, thereby enabling the input of information through a user's touch. The display module 151, as shown in FIG. 2, may be implemented using first and second display modules 151a and 151b.

The first sound output module 153 may be implemented in a receiver or speaker form. The first camera 121a may be implemented to capture still images or motion pictures of a user, etc. The microphone 123 may be implemented to receive a user's voice, other sound, etc.

The first to third user input units 130a, 130b, and 130c may be collectively called the user input unit 130. Any method as long as it supports a tactile manner may be used for the user input unit 130.

For example, the user input unit 130 may be implemented using a dome switch or a touch pad which can receive commands or information through a user's push or touch manipulation or may be implemented using a wheel or jog method of rotating a key, a method using Joystick or the like. In terms of a function, the first user input unit 130a may be used to input commands, such as start, end, and call. The second user input unit 130b may be used to select an operation mode and so on. The third user input unit 130c may be used as a hot key for activating special functions within the mobile terminal 100.

When a user's finger approaches the display module 151, the proximity sensor 141 disposed in the first body or the like detects such approach and outputs a proximity signal. Here, the proximity sensor 141 may be configured to output a different proximity signal according to the distance where the user's finger is placed. In general, a distance from which a proximity signal is output when a detection object approaches the proximity sensor is called a detection distance. If a plurality of the proximity sensors having different detection distances is used and proximity signals output from the respective proximity sensors are compared with each other, how far the object has approached the display module 151 can be known.

Further, if a plurality of the proximity sensors having different detection areas is used and from which one of the proximity sensors is a proximity signal output is known, which area of the display module 151 is an object approaching, whether an object is approaching the display module 151 and so on can be known. Accordingly, the controller 180 may select a touch key corresponding to a position that a user's finger, etc. has approached and may output a corresponding vibration signal.

If a user tilts or shakes the mobile terminal 100, the gyro sensor 142 detects the motion of the mobile terminal, generates a signal corresponding to the motion of the mobile terminal, and outputs it to the controller 180. The controller 180 detects information which is pertinent to the motion of the mobile terminal, such as a movement direction, a movement angle, a movement velocity, a movement strength, and a current position, from the signal generated by the gyro sensor 142.

The controller 180 tracks the motion of the mobile terminal 100 based on the information which has been detected from the signal generated by the gyro sensor 142. Information which can be detected from a signal generated by the gyro sensor 142 may differ according to components constituting the gyro sensor 142. A mobile terminal is equipped with the gyro sensor 142 which is configured to detect a specific piece of motion information. Further, at least one gyro sensor 142 may be provided in the mobile terminal 100. The controller 180 may control the gyro sensor 142 so that it operates only when a certain application is executed in response to information to be detected.

Figure 3:
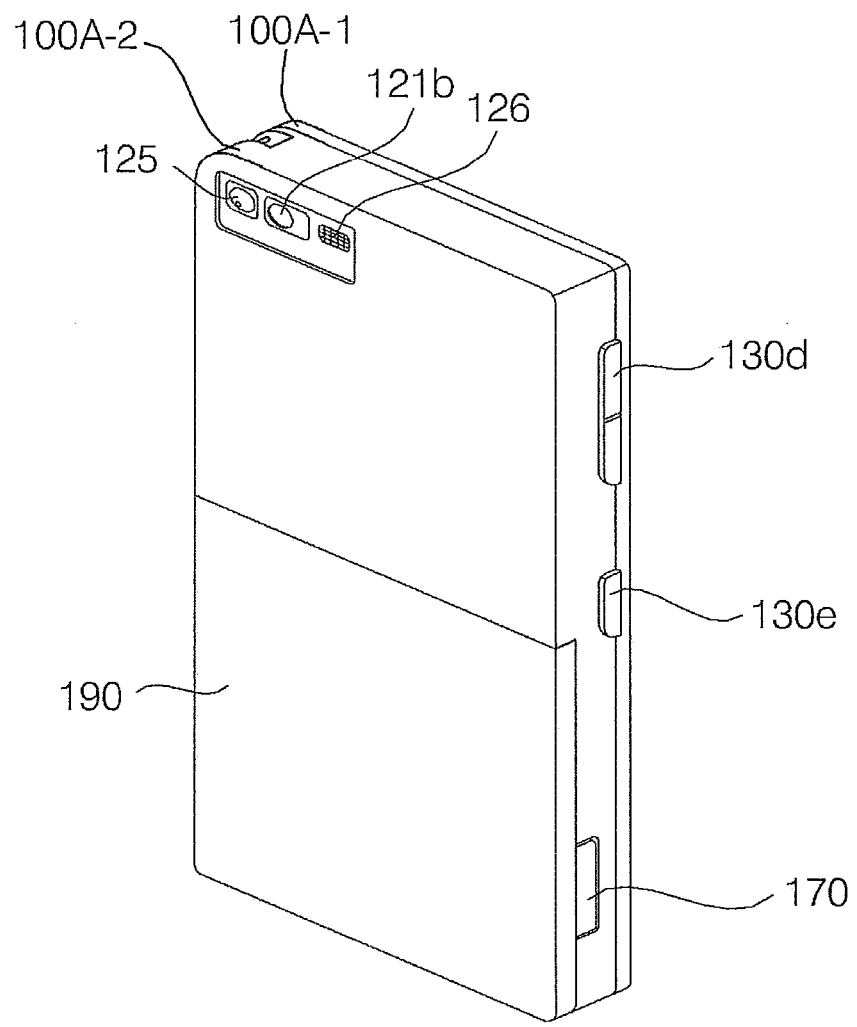
FIG. 3 is a rear perspective view of the mobile terminal in accordance with the embodiment of the present invention.

FIG. 3 is a rear perspective view of the mobile terminal 100 shown in FIG. 2. Referring to FIG. 3, a fourth user input unit 130d, a fifth user input unit 130e, and the interface unit 170 may be disposed on one of the sides of the rear casing 100A-2. A second camera 121b may be further mounted on the back side of the rear casing 100A-2.

The second camera 121b has a photographing direction substantially opposite to that of the first camera 121a and may have different pixels from the first camera 121a. For example, the first camera 121a may have low pixels enough to capture an image of a user's face and transmit the captured image to a counterpart in the video call, etc. The second camera 121b preferably may have high pixels because captured images of subjects are for the most part not transmitted immediately.

A flash 125 and a mirror 126 may be further disposed near the second camera 121b. The mirror 126 is configured to reflect a user's face, etc. when the user wants to have his picture taken (self-photographing) using the second camera 121b. The flash 125 is configured to illuminate light to a subject when the subject is photographed using the second camera 121b.

A second sound output module (not shown) may be further disposed in the rear casing 100A-2. The second sound output module, together with the first audio output module 153a, may implement a stereo function and may also be used for calls in the speakerphone mode.

An antenna for calls and an antenna (not shown) for receiving broadcasting signals may be disposed on one side of the rear casing 100A-2. The antennas may be drawn out from the rear casing 100A-2.

The interface unit 170 becomes a passage through which the mobile terminal 100 can exchange data with external devices. For example, the interface unit 170 may be at least one of a connector for connecting to an earphone, a port for short-range communication, and power supply terminals for supplying power to the mobile terminal 100 in a wired or wireless manner. The interface unit 170 may be a subscriber identification module (SIM), a user identity module (UIM), or a card socket for accommodating an external card, such as a memory card for storing information.

The power supply unit 190 for supplying power to the mobile terminal is mounted on the part of the rear casing 100A-2. The power supply unit 190 may be, for example, a rechargeable battery and may be detachably coupled to the rear casing 100A-2 for recharging purposes.

It has been described above that the second camera 121b, etc. are disposed in the rear casing 100A-2, but the present invention is not limited to the above example. Further, although the second camera 121b is not separately provided in the mobile terminal, the first camera 121a may be rotatably configured in such a way as to cover the photographing direction of the second camera 121*b*.

Figure 4:
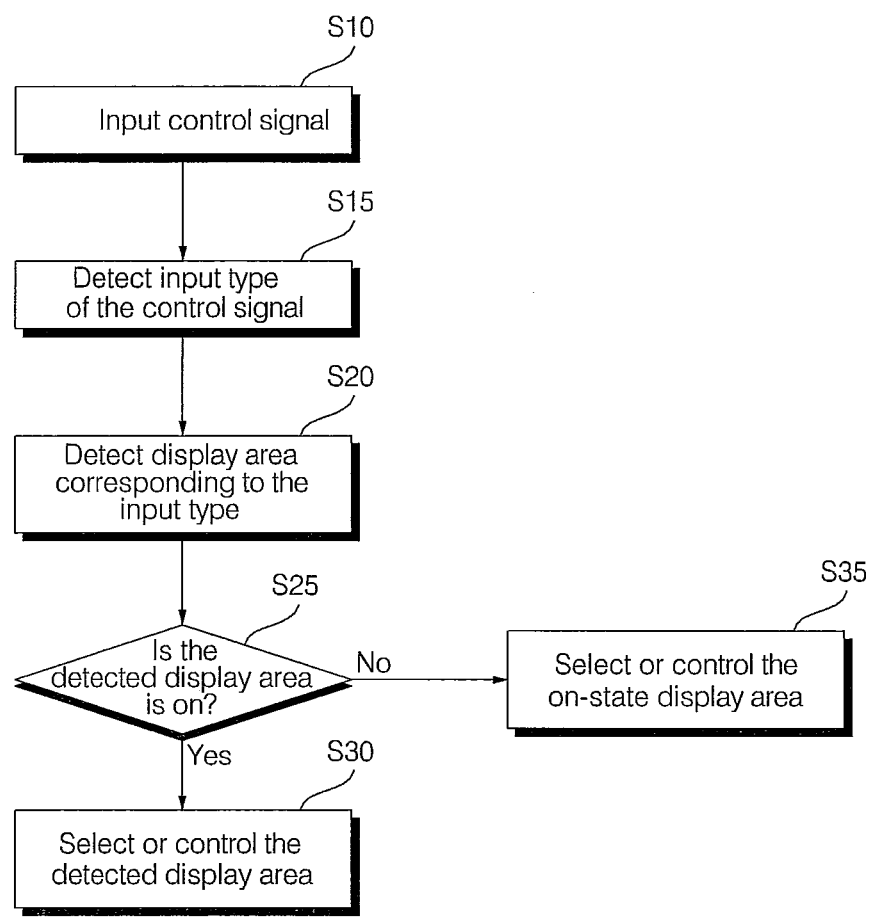
FIG. 4 is a flowchart illustrating a method of controlling the mobile terminal in accordance with a first embodiment of the present invention.
Figure 5:
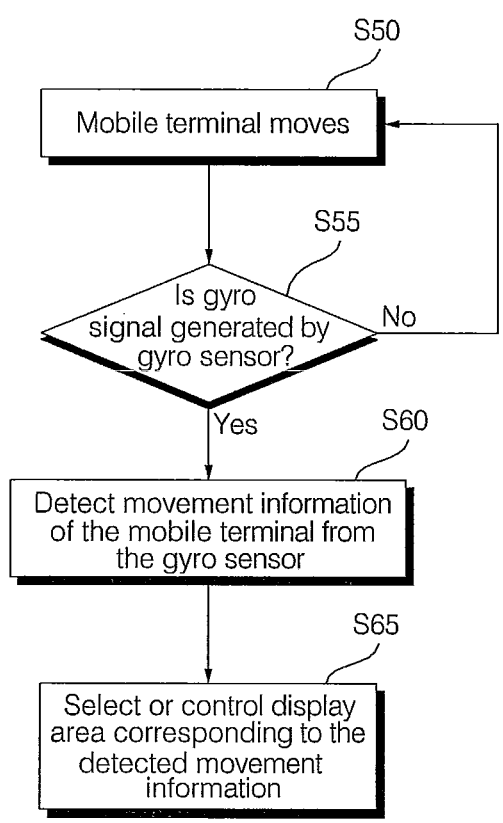
FIG. 5 is a flowchart illustrating a method of controlling the mobile terminal in accordance with a second embodiment of the present invention.
Figure 6:
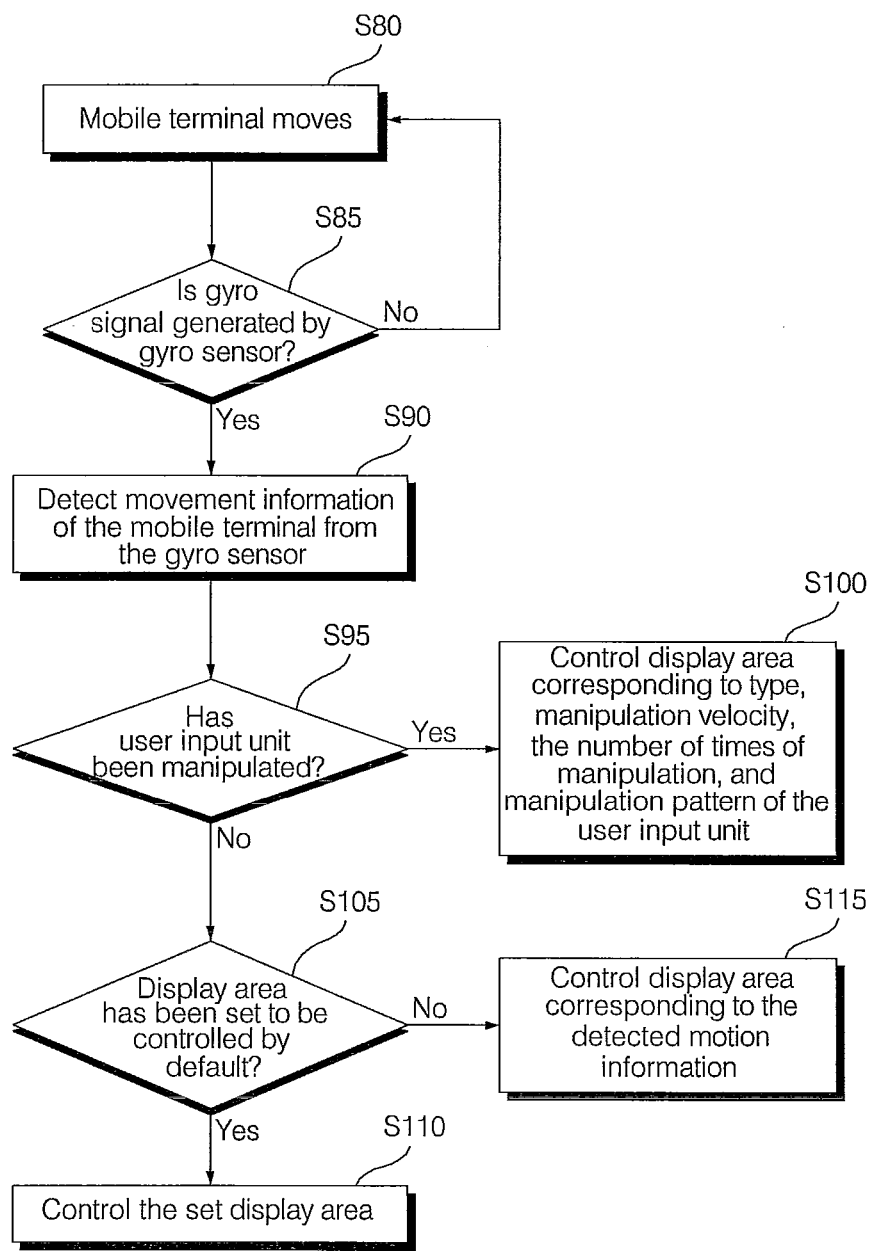
FIG. 6 is a flowchart illustrating a method of controlling the mobile terminal in accordance with a third embodiment of the present invention.

FIGS. 4 to 6 are flowcharts illustrating methods of controlling the mobile terminal according to some embodiments of the present invention.

FIG. 4 is a flowchart illustrating a method of controlling the mobile terminal in accordance with a first embodiment of the present invention.

When a control signal is input to the mobile terminal at step S10, the controller 180 detects a type of the control signal at step S15.

For example, a user may input a control command to the mobile terminal by manipulating the user input unit 130 provided in the mobile terminal. The controller 180 detects a type of the control signal by detecting a type, a manipulation velocity, the number of times of manipulation, or a manipulation pattern of the user input unit 130 which is manipulated by a user.

For another example, a user may rotate, shake, or move the mobile terminal at a certain angle. The gyro sensor 142 generates a gyro signal in response to the motion of the mobile terminal. When the gyro signal is generated, the controller 180 determines that a control signal has input to the mobile terminal. The controller 180 can detect motion information, including a rotation angle, a rotation velocity, a shaking strength, the number of times of shaking, etc. of the mobile terminal, from the gyro signal. The controller 180 detects a type of the control signal from the motion information detected from the gyro signal.

The controller 180 detects a display area which is controlled in response to the detected type at step S20. The mobile terminal of the present embodiment includes at least two display areas. The display areas may be displayed in a single display module or may be displayed in respective display modules which are physically separated from each other.

A display area that is controlled in response to an input type of a control signal which can be input to the mobile terminal can be set. For example, a user can designate a display area corresponding to an input type of a control signal. For another example, a user can designate an input type of a control signal corresponding to a display area. The controller 180 detects a display area corresponding to an input type of a control signal based on previously set information.

In the case where at least two display areas are provided in the mobile terminal, only some of the display areas may be in an on state. For example, some of a plurality of display areas can be in an on state according to the closed configuration of the mobile terminal.

The controller 180 determines whether the display area corresponding to the input type of the control signal is in an on state at step S25.

If, as a result of the determination, the detected display area is determined to be in an on state, the controller 180 selects the detected display area and changes the brightness, color, sharpness, etc. of the selected display area, controls vibration so that it is generated in the selected display area, or displays an indicator icon in the selected display area at step S30.

Further, the controller 180 may control the selected display area in response to the input control signal. For example, when the mobile terminal equipped with two display areas on the left and right sides rotates to the right, the controller 180 selects the display area on the right side in response to the motion direction of the mobile terminal. If the mobile terminal maintains the state in which it is rotated to the right, the controller 180 may drag a list which is displayed in the display area on the right side.

For another example, if the mobile terminal equipped with two display areas on the left and right sides rotates to the right, the controller 180 selects the display area on the right side. If the mobile terminal maintains the state in which it is rotated to the left, the controller 180 may control an object, corresponding to a highlighted item or icon from among items or icons displayed in the display area, to be displayed in the display area on the right side. Further, the controller 180 may execute an application corresponding to the highlighted item or icon. In addition, the controller 180 may control an object included in a list to be displayed on display areas which are sequentially selected.

If, as a result of the determination at step S25, the detected display area is determined not to be in an on state, the controller 180 may select a turned-on display area or may control a display area to be in an on state at step S35.

In FIG. 4, the control signal is input to the mobile terminal 100 when the user input unit is manipulated or a gyro signal is generated by the gyro sensor. The controller 180 may assign priorities to the user input unit and the gyro sensor. For example, the controller 180 may assign a higher priority to the gyro sensor. In the case where the user input unit is manipulated while the mobile terminal is moved, the controller 180 may select a display area in response to information about the motion of the mobile terminal and control the selected display area in response to information about the user input unit.

For another example, if a gyro signal is generated by the gyro sensor when the user input unit is not manipulated, the controller 180 may select a display area in response to motion information of the mobile terminal and control the selected display area in response to the motion information of the mobile terminal.

As described above, the embodiment of the present invention provides a method of selecting or controlling one of at least two display areas in response to the motion of the mobile terminal or an input type of a control signal which is input to the mobile terminal when the user input unit is manipulated. It is to be noted that the embodiment of FIG. 4 does not limit the scope of the present invention.

FIG. 5 is a flowchart illustrating a method of controlling the mobile terminal in accordance with a second embodiment of the present invention. The method of controlling the mobile terminal in accordance with the second embodiment of the present invention is described below in detail.

The controller 180 determines whether a gyro signal is generated by the gyro sensor 142 at step S55 in response to the motion of the mobile terminal (S50).

If, as a result of the determination, the gyro signal is determined to have been generated by the gyro sensor 142, the controller 180 detects motion information, including a rotation direction, a rotation angle, etc. of the mobile terminal, from the gyro signal at step S60.

The controller 180 controls a display area corresponding to the detected motion information at step S65.

For example, in the case where at least two display areas are being displayed on upper and lower parts of the mobile terminal, if it is determined that the upper part of the mobile terminal is moving through a gyro signal, the controller 180 controls the display area displayed on the upper part. If it is determined thon the lower part of the mobile terminal is moving through a gyro signal, the controller 180 controls the display area displayed on the lower part.

For another example, in the case where at least two display areas are being displayed on the left and right sides of the mobile terminal, when detecting that the mobile terminal is moving to the right through a gyro signal, the controller 180 controls the display area displayed on the right side. When detecting that the mobile terminal is moving to the left through a gyro signal, the controller 180 controls the display area displayed on the left side.

In the present embodiment, the controller 180 controls the mobile terminal in response to the motion of the mobile terminal. It is to be noted that motion information and a corresponding display area of the mobile terminal, which have been described above in the present embodiment, do not limit the scope of the present invention.

FIG. 6 is a flowchart illustrating a method of controlling the mobile terminal in accordance with a third embodiment of the present invention. As described above with reference to FIG. 4, a user may input a control signal to the mobile terminal by manipulating the user input unit of the mobile terminal simultaneously with the motion of the mobile terminal. The controller 180 detects motion information of the mobile terminal, determines whether the user input unit has been manipulated, detects a type, a manipulation velocity, the number of times of manipulation, a manipulation pattern, etc. of the user manipulating portion, and controls a corresponding display area. Hereinafter, a method of controlling the mobile terminal in response to motion information of the mobile terminal and information of the user input unit is described in detail.

The controller 180 determines whether a gyro signal is generated by the gyro sensor 142 at step S85 in response to the motion of the mobile terminal (S80). If, as a result of the determination, the gyro signal is determined to have been generated by the gyro sensor 142, the controller 180 detects motion information of the mobile terminal from the gyro signal at step S90.

Next, the controller 180 determines whether the user input unit has been manipulated at step S95. If, as a result of the determination, the user input unit is determined to have been manipulated, the controller 180 changes the selected display area or controls the selected display area in response to a control signal which corresponds to a type, a manipulation velocity, the number of times of manipulation, a manipulation pattern, etc. of the manipulated user input unit at step S100.

For example, at least two display areas may be displayed on the upper and lower parts of the mobile terminal. The controller 180 may detect the manipulation of a side key which is placed on the upper part, from among side keys provided in the mobile terminal, simultaneously with the motion of the mobile terminal. Even in the case where the display area displayed on the lower part is selected in response to motion information of the mobile terminal, the controller 180 changes a selected display area so that the display area displayed on the upper part is selected.

For another example, controller 180 may detect the manipulation of a side key placed on the lower part, from among the side keys provided in the mobile terminal, simultaneously with the motion of the mobile terminal. Here, even in the case where the display area displayed on the upper part is selected in response to motion information of the mobile terminal, the controller 180 changes a selected display area so that the display area displayed on the lower part is selected.

For another example, at least two display areas may be displayed in respective touch screens of the mobile terminal which are physically separated from each other. The controller 180 determines whether a touch screen has been touched simultaneously with the motion of the mobile terminal. If a touch on a touch screen placed on the upper part is detected simultaneously with the motion of the mobile terminal, the controller 180 controls a display area displayed on the touch screen on the upper part so that the upper part of the display area is selected. If a touch on a touch screen placed on the lower part is detected simultaneously with the motion of the mobile terminal, the controller 180 controls a display area displayed on the touch screen placed on the lower part so that the lower part of the display area is selected.

For yet another example, one of at least two display areas may be displayed on a touch screen. The controller 180 determines whether there is a touch on the touch screen simultaneously with the motion of the mobile terminal. If a touch on the touch screen is detected simultaneously with the motion of the mobile terminal, the controller 180 controls a display area displayed on the touched touch screen so that the display area is selected. If only the motion of the mobile terminal is detected, the controller 180 controls a display area not displayed on the touch screen so that the display area not displayed on the touch screen is selected.

As still yet another example, the user manipulating portions corresponding to at least two display areas, respectively, can be set. The controller 180 determines whether a certain user input unit has been manipulated simultaneously with the motion of the mobile terminal. The controller 180 selects a display area corresponding to the manipulated user input unit.

Further, the controller 180 may control the selected display area in response to a control signal which corresponds to a manipulation velocity, the number of times of manipulation, a manipulation pattern, etc. of the manipulated user input unit. For example, if the user input unit is manipulated twice shortly, the controller 180 may determine that a control command for terminating an application in which an execution screen is displayed in the selected display area has been input and may terminate the application. For another example, if the user manipulating portion is manipulated once for a predetermined term of time, the controller 180 may determine that a control command for increasing the brightness of the selected corresponding display area has been input and may control the brightness of the selected display area.

If, as a result of the determination at step S95, the user input unit is determined not to have been manipulated, the controller 180 determines whether there is a display area which has been set to be controlled by default at step 105. For example, at least two display areas may be displayed on the upper and lower parts of the mobile terminal. If the user input units corresponding to the respective display areas are not manipulated, the controller 180 may set the display area displayed on the upper part to be controlled so that the set display area is controlled in response to a gyro signal.

If, as a result of the determination, there is a display area that has been set by default, the controller 180 controls the set display area at step S10.

However, if, as a result of the determination, there is no display area that has been set by default, the controller 180 controls a display area corresponding to the detected motion information at step S115. For example, the controller 180 may control a display area corresponding to a rotation direction, etc. of the mobile terminal, as shown in FIG. 5.

Hence, as a result of the determination at step S95, the user input unit is determined not to have been manipulated, the controller 180 may control the selected display area in response to a control signal corresponding to the gyro signal.

It is to be noted that an input type of a control signal, a position where a display area is displayed, a display area corresponding to an input type of a control signal, a type of a control signal corresponding to a gyro signal, etc., which have been described in the present embodiment, may be set otherwise, and do not limit the scope of the present invention.

FIGS. 7 to 16 are diagrams showing examples of display areas which are controlled according to the method of controlling the mobile terminal in accordance with the embodiments of the present invention.

FIG. 7 is a diagram showing an example in which an indicator icon is displayed in a selected display area or a display state of the selected displayed area is changed in response to the motion of the motion terminal according to the present invention.

The controller 180 displays a first display area 200 in the first display module 151*a* and a second display area 300 in the second display module 151*b*.

If a user moves the mobile terminal to the right as shown in FIG. 7(*a*), the controller 180 selects the second display area 300 displayed on the right side, from among the first and second display area 200 and 300.

Further, as shown in FIG. 7(*b*), the controller 180 may display an indicator icon 305 in the second display area 300 or change the display state of the second display area 300 brightly. Accordingly, a user can know which display area has been selected in response to the motion of the mobile terminal.

The controller 180 may change a display state, such as color, sharpness, or brightness of a display area corresponding to an input type of a control signal. The controller 180 may control vibration so that it is generated in a display area corresponding to an input type. Further, the controller 180 may control the sound of an application in which a controlled display area is being executed so that the sound is output.

FIG. 8 is a diagram showing an example in which one of two display areas is controlled in response to strength of movement of the motion terminal according to the present invention.

A user may shake the mobile terminal at a specific strength or more or at a specific strength or less. In the present embodiment, the controller 180 may detect a shaking strength of the mobile terminal and control one of first and second display areas 250 and 350.

As shown in FIG. 8(*a*), the first and second display areas 250 and 350 are displayed at respective upper and lower parts of the mobile terminal.

If a user moves the mobile terminal, the gyro sensor 142 generates a gyro signal including motion information of the mobile terminal. The controller 180 detects information about the strength of the motion from the gyro signal.

If the gyro signal is generated for a certain time period or more, the controller 180 calculates information about the movement strength of the mobile terminal for a certain time period. FIG. 8(*b*) shows a graph in which display areas are controlled in response to respective motion intensities of the mobile terminal. As shown in FIG. 8(*b*), if a detected movement strength of the mobile terminal is a reference value "c" or less, a first display area 250 is controlled in response to the gyro signal. If a detected movement strength of the mobile terminal is the reference value "c" or more, a second display area 350 is controlled in response to the gyro signal.

Meanwhile, while moving the mobile terminal, a user can select a display area to be controlled by manipulating the user input unit, such as a hard key, a jog wheel, a track ball, a touch screen, a touch wheel, or a soft key provided in the mobile terminal. Even a gyro signal is generated, the controller 180 may select or control one of display areas according to whether the user input unit has been manipulated or in response to a type, a manipulation velocity, the number of times of manipulation, a manipulation pattern, etc. of a user manipulating portion which has been manipulated by a user. Also the controller 180 may select a display area according to a movement type of the mobile terminal and, when the user input unit is manipulated, change the selected display area so that a display area corresponding to information about the user input unit is selected. This example is described below in detail with reference to FIGS. 9 to 11.

FIGS. 9 to 11 are diagrams showing examples in which one of two display areas is selected in response to the manipulation of the user input unit of the mobile terminal according to the present invention.

In FIG. 9, the mobile terminal includes first and second display areas 250 and 350 and a touch pad 400. As shown in FIG. 9(*a*), a user may touch the upper part of the touch pad 400 while moving the mobile terminal to the right.

When the gyro sensor 142 generates a signal in response to the motion of the mobile terminal, the controller 180 determines whether the user input unit has been manipulated. The controller 180 that has detected the touch on the touch pad 400 detects a touch area of the touch pad 400. The controller 180 selects or controls a display area corresponding to the detected touch area.

As the upper part of the touch pad 400 has been touched as in FIG. 9(*a*), the controller 180 selects the first display area 250 displayed at the upper part of the mobile terminal as shown in FIG. 9(*b*). If a user touches the lower part of the touch pad 400, the controller 180 selects the second display area 350 displayed at the lower part of the mobile terminal.

In FIG. 10, the first and second display areas 250 and 350 are displayed on respective touch screens. When a gyro signal is generated, the controller 180 selects or controls a display area displayed on a touch screen that has been touched.

As shown in FIG. 10(*a*), a user touches the touch screen displayed in the first display area 250 while rotating the mobile terminal to the right. The controller 180 that has detected the touch selects the first display area 250 displayed on the touched touch screen, as shown in FIG. 10(*b*).

For another example the mobile terminal 100 may set priorities between control signals designating which display area to be selected or controlled. In the case, where in FIG. 10, any touch on touch screens displaying at least two respective display areas has not been detected, the controller 180 may select, the first display area 250 which has been set by default. For another example, the controller 250 may control a display area which displays a screen on which an application is now being executed in preference to other display areas in response to a gyro signal or a control signal corresponding to information of the user input unit.

In FIG. 11, only the second display area 350 of the first and second display areas 250 and 350 is displayed on a corresponding touch screen.

If a user rotates the mobile terminal to the right as shown in FIG. 11(*a*), the controller 180 determines whether any touch screen has been touched.

The controller 180 that has not detected a touch on any touch screen selects the second display area 350 as shown in FIG. 11(*b*). If a touch screen is touched, the controller 180 may select a display area displayed on the touched touch screen.

Alternatively, the user input unit of the mobile terminal in addition to the touch screens may be set to correspond to respective display areas. When a gyro signal is generated, the controller 180 may select or control a display area corresponding to a type of a manipulated user input unit. It is to be noted that an input type of a control signal, a type of the user manipulating portion, and a corresponding display area according to the present embodiment do not limit the scope of the present invention.

FIGS. 9 to 11 illustrate the embodiments in which, in the case where a touch screen (i.e., one of the user manipulating portions) is manipulated when the mobile terminal moves, the controller 180 selects a display area in response to a touched touch screen, a touch pattern of a touch screen or the like. However, the controller 180 may select a display area in response to information of the user input unit.

For example, in the case where a display area corresponding to a movement type of the mobile terminal differs from a display area corresponding to information of the user input unit, the controller 180 may change a selected display area such that the display area corresponding to the movement type is first selected and another display area is then selected.

For another example, in the case where a display area corresponding to a movement type of the mobile terminal differs from a display area corresponding to information of the user input unit, the controller 180 may give a priority to information of the user input unit and select a display area corresponding to the information of the user input unit.

For yet another example, the controller 180 may give different priorities to motion of the mobile terminal and the user input unit. That is, the controller 180 may select a display area corresponding to a movement type and then control the selected display area in response to a control signal corresponding to information of the user input unit. Further, the controller 180 may select a display area corresponding to information of the user input unit and then control the selected display area in response to a control signal corresponding to a gyro signal.

As described above, the controller 180 may select, change, or control a display area in response to the motion of the mobile terminal or a manipulation sequence of the user input unit. It is however to be noted that the above examples do not limit the scope of the present invention.

Figure 12:
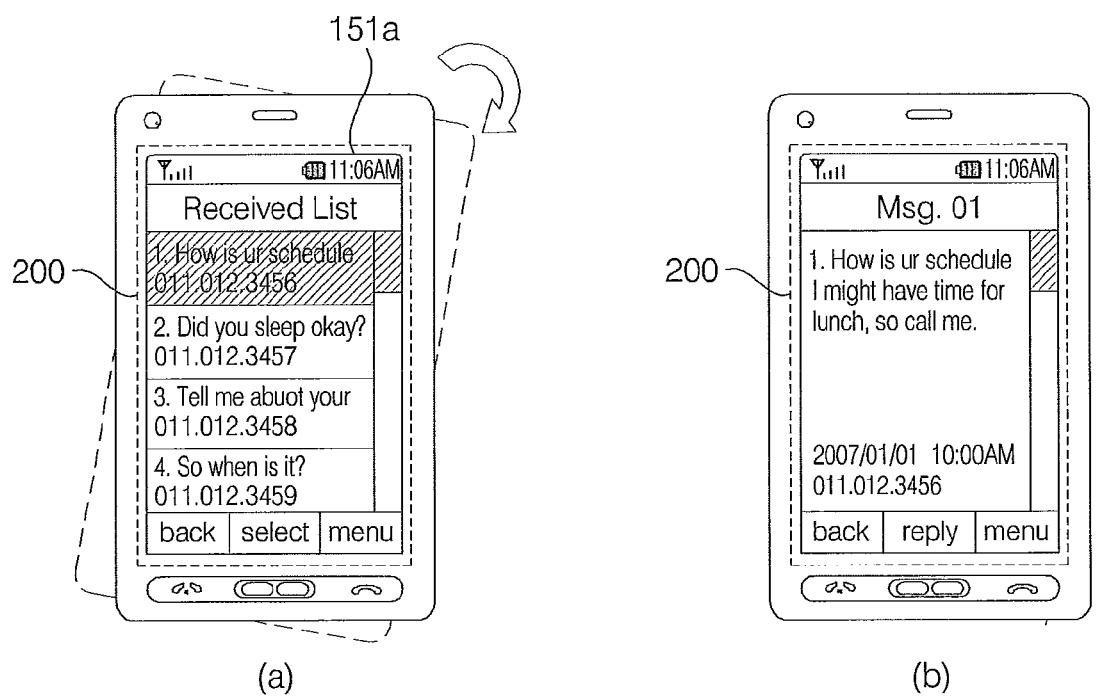
FIG. 12 is a diagram showing an example in which one of two display areas of the mobile terminal according to the present invention is in an on state.

FIG. 12 is a diagram showing an example in which one of two display areas of the mobile terminal according to the present invention is in an on state.

In the case where a display area corresponding to a motion direction of the mobile terminal, from among display areas of the mobile terminal, is set to be controlled, the controller 180 detects information about a motion direction of the mobile terminal from a gyro signal which has been generated in response to the motion of the mobile terminal.

If, as shown in FIG. 12(*a*), a user moves the mobile terminal to the right, the controller 180 detects information about such right motion of the mobile terminal and determines that a second display area placed on the right side, from among first and second display areas 200 and 300, will be selected in response to a gyro signal.

The controller 180 determines whether the second display area 300 is in an on state. In this case, the mobile terminal has a closed configuration, and only the first display area 200 is being activated, as shown in FIG. 12(*a*).

If it is determined that the second display area 300 corresponding to an input type of a control signal is not in an on state, the controller 180 controls the first display area 200 which is in an on state in response to a gyro signal. As shown in FIG. 12(*b*), the controller 180 selects the first display area 200 which is in an on state. Further, as shown in FIG. 12(*b*), the controller 180 may display the contents of a highlighted message, from among a list of received messages, on the first display area 200. That is, the controller 180 may select a display area and may control the selected display area in response to a control signal corresponding to the gyro signal.

Figure 13:
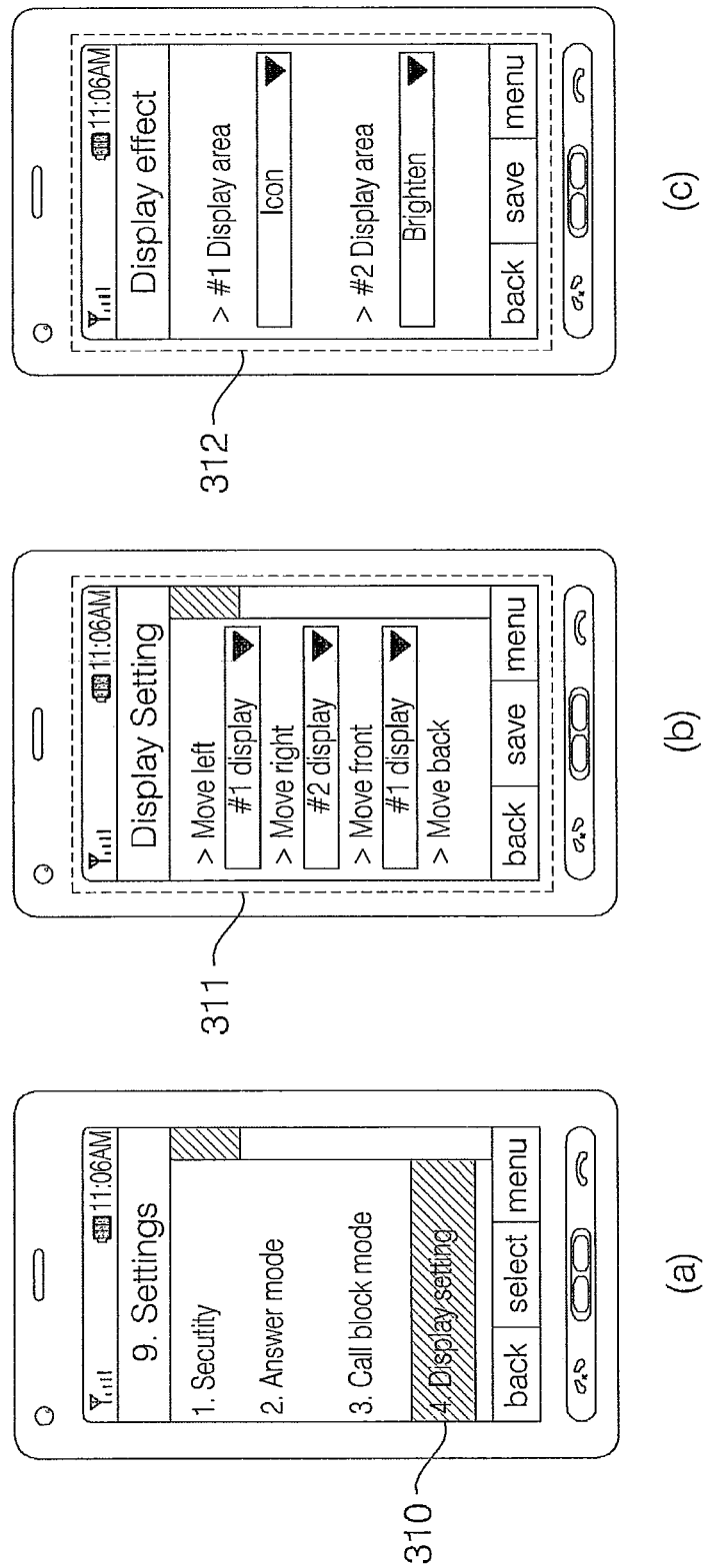
FIG. 13 is a diagram showing an example in which a display area is set in response to an input type of a control signal which can be input to the mobile terminal of the present invention.

FIG. 13 is a diagram showing an example in which a display area is set in response to an input type of a control signal which can be input to the mobile terminal of the present invention.

As show in FIG. 13(*a*), a user can select an item '4. Display setting' 310 from a mobile terminal setting list and can set a display area or change the setting of a display area corresponding to the motion information of the mobile terminal.

If a user selects the item '4. Display setting' 310, the controller 180 displays a setting window 311 for enabling a user to set up an input type of a control signal that can be input to the mobile terminal and a display area corresponding to the input type, as show in FIG. 13(*b*).

Further, as show in FIG. 13(*c*), the controller 180 may display an effect setting window 312 for enabling an indicator icon to be displayed in a display area controlled in response to an input control signal or enabling a user to change the brightness, etc. of a display area. Furthermore, a user may control the effect setting window 312 so that vibration is generated from a controlled display area or sound generated from a controlled display area is output.

The embodiment of FIG. 13 illustrates an example in which a display area corresponds to a gyro signal which is generated in response to the motion of the mobile terminal. It is however to be noted that types of a control signal that can be input to the mobile terminal can be various, and the present embodiment does not limit the scope of the present invention.

Figure 14:
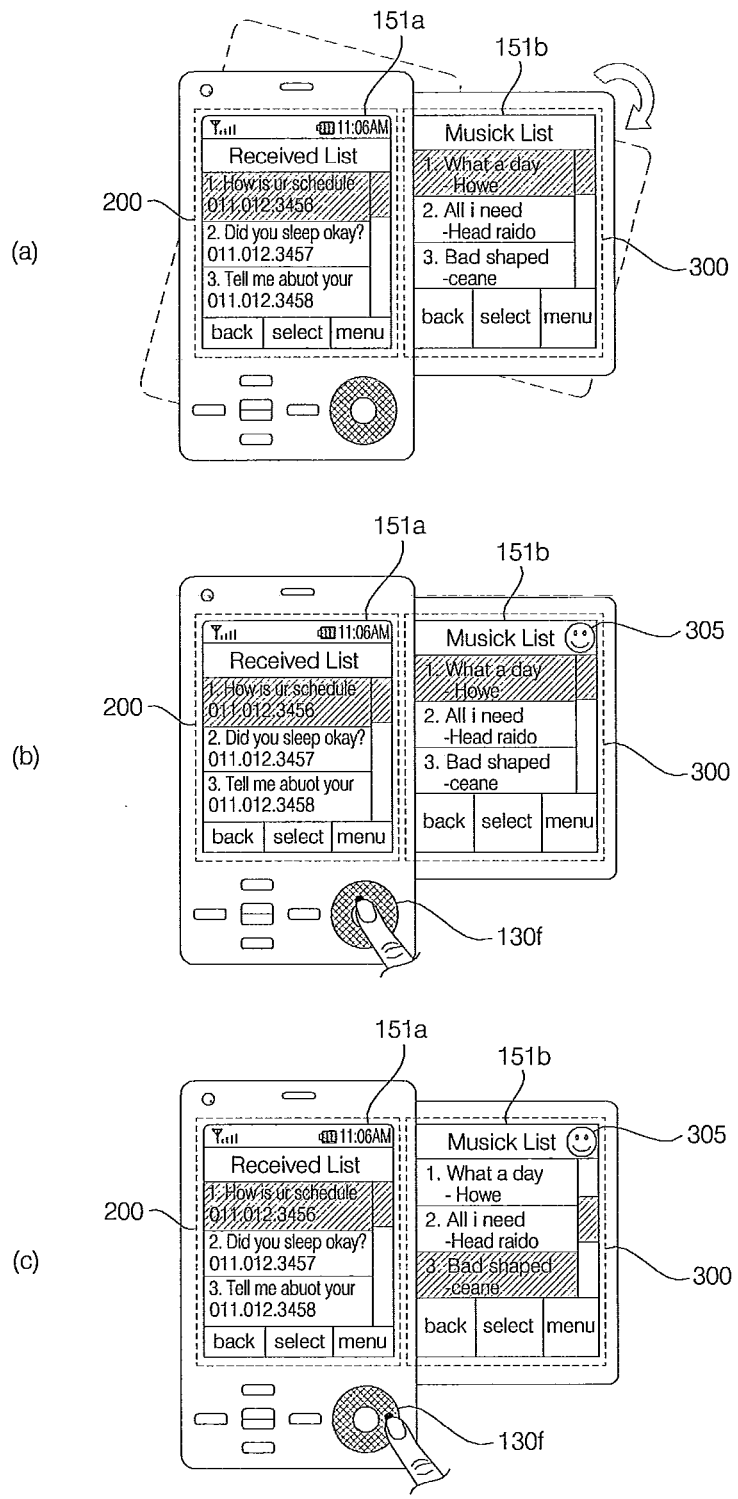
FIG. 14 is a diagram showing an example in which one of two display areas is selected or controlled in response to the manipulation of a touch wheel.

FIG. 14 is a diagram showing an example in which a display area selected in response to the motion of the mobile terminal is controlled in response to the manipulation of the user manipulating portion.

As shown in FIG. 14, the controller 180 displays the first and second display areas 200 and 300 on the first and second display modules 151*a* and 151*b*, respectively. If a user rotates the mobile terminal to the right as shown in FIG. 14(*a*), the gyro sensor 142 generates a gyro signal. The controller 180 that has detected the generated gyro signal detects motion information of the mobile terminal from the gyro signal.

The controller 180 determines that the mobile terminal has rotated to the right and, as shown in FIG. 14(*b*), selects the second display area 300 displayed on the second display 151*b*. The controller 180 displays an indicator icon 305 in the second display area 300 so that the user can know that the second display area 300 has been selected.

A user may manipulate a touch wheel 130*f* provided in the mobile terminal while rotating the mobile terminal to the right or after rotating the mobile terminal to the right. A user may rotate the touch wheel 130*f* clockwise as shown in FIGS. 14(*b*) and 14(*c*).

The controller 180 drags a list displayed in the second display area 300 in response to a manipulation pattern of the touch wheel 130*f*, as shown in FIG. 14(*c*).

In the present embodiment, the controller 180 selects a display area corresponding to a gyro signal and controls the selected display area in response to the manipulation of the touch wheel 130*f*. A control signal corresponding to the manipulation of the touch wheel 130*f* is described below. In the case where a list is being displayed in a selected display area, the controller 180 determines that a drag control command has been input and drags the list. If there is a highlighted item or an icon, the controller 180 determines that an object display command corresponding to the highlighted item or the icon has been input and displays a corresponding object. If an application corresponds to the item or the icon, the controller 180 executes the corresponding application.

In the case where a certain object is being displayed in a selected display area, the controller 180 may display pertinent information or an icon of the displayed object or display a next object following the displayed object. For example, in the case where photographs constituting a photo album are being displayed in a selected display area, the controller 180 may display pertinent information, such as photo names or file information, display an icon corresponding to a photo edition menu, or display a next photo in a display area which is sequentially selected.

FIG. 14 shows the example in which a display area corresponding to a movement type of the mobile terminal is selected and the selected display area is controlled in response to information of the user input unit. Unlike the above example, if the user input unit is not manipulated, the controller 180 may detect motion information of the mobile terminal from a gyro signal and select a display area in response to a movement type corresponding to the detected motion information. The controller 180 may control the selected display area in response to a control signal corresponding to the gyro signal. This example is described below with reference to FIGS. 15 and 16.

Figure 15:
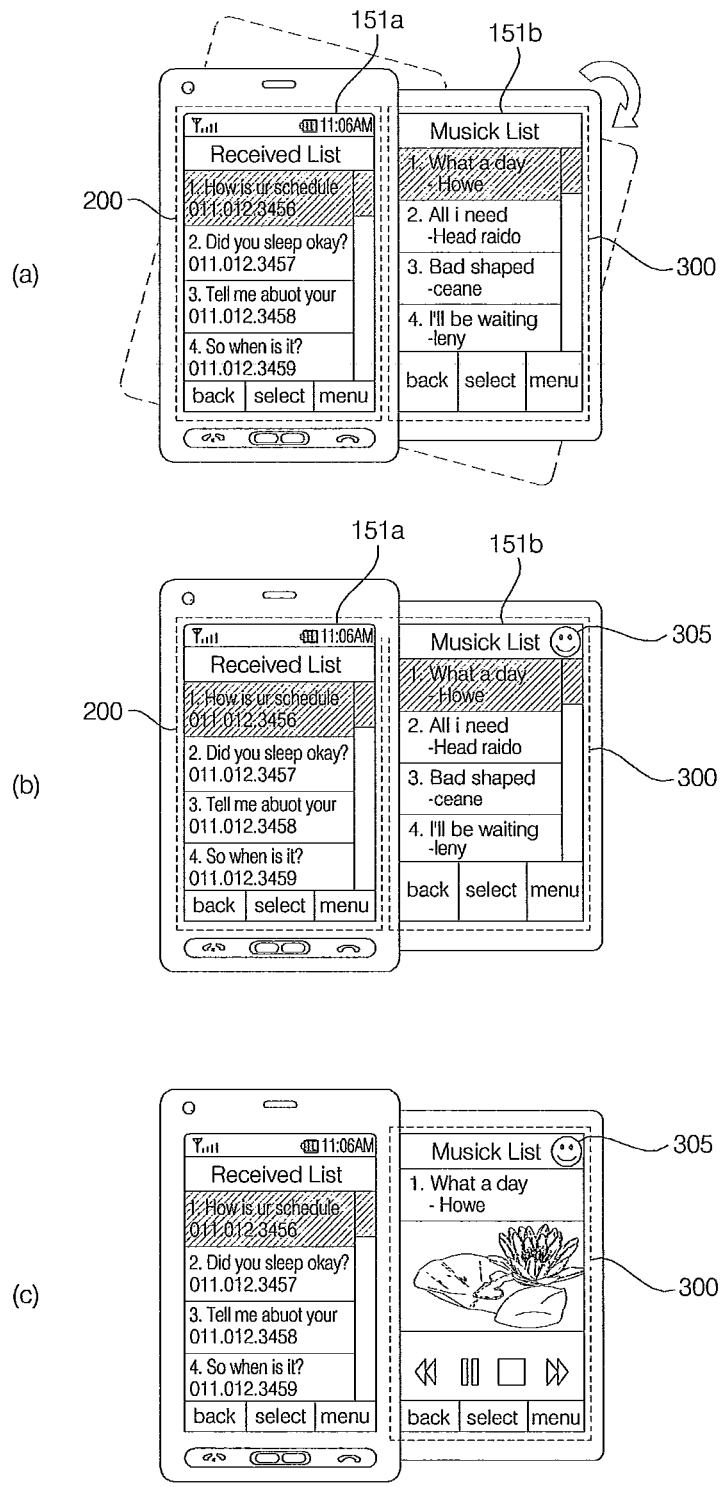
FIGS. 15 and 16 are diagrams showing examples in which one of two display areas is selected or controlled in response to a rotation direction of the mobile terminal.
Figure 16:
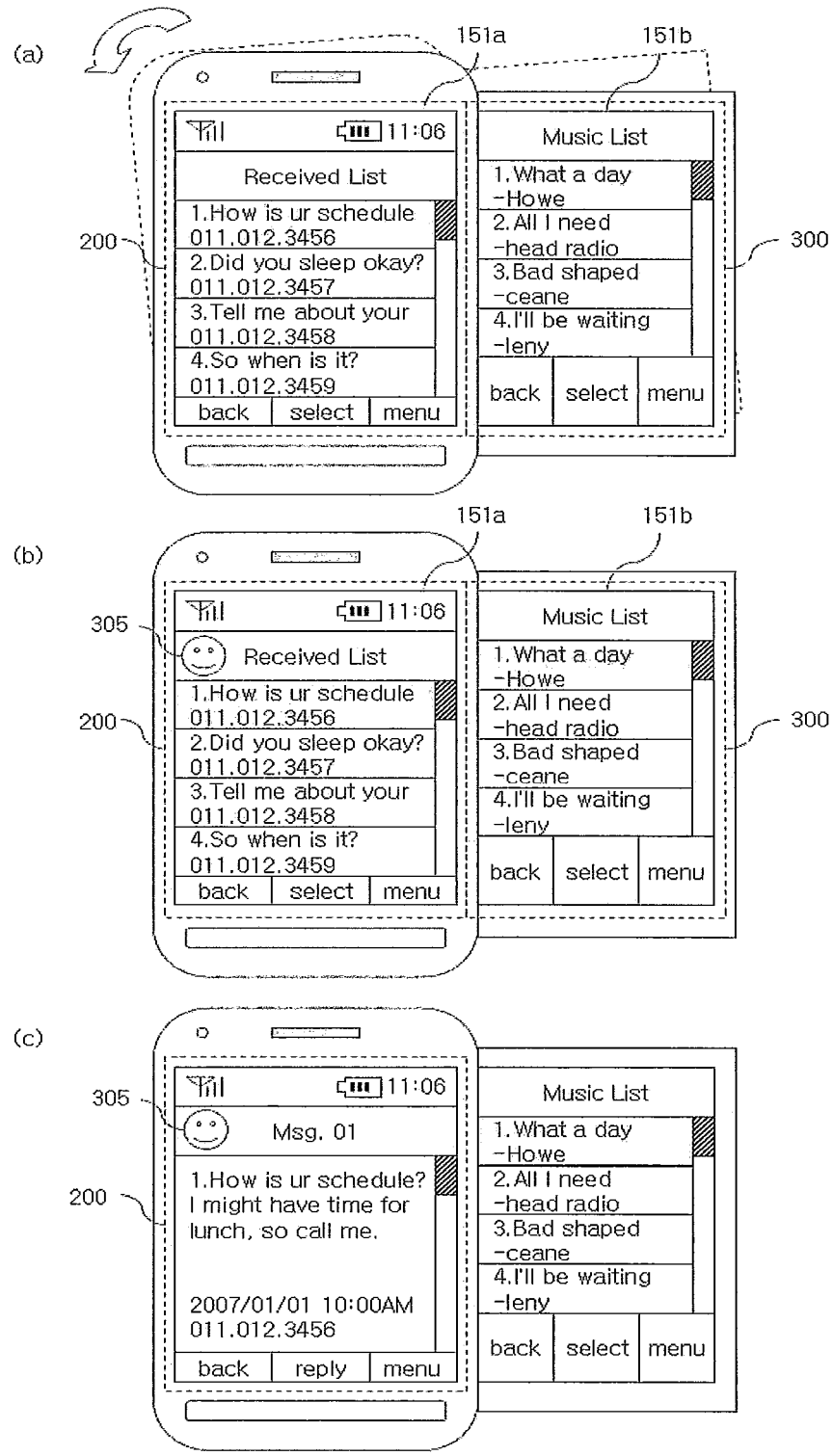

FIGS. 15 and 16 are diagrams showing examples in which a display area is controlled in response to a rotation direction of the mobile terminal.

As shown in FIG. 15(a), the controller 180 displays the first display area 200 on the first display module 151a and the second display area 300 on the second display module 151b.

In the present embodiment, the controller 180 displays a list of received messages in the first display area 200 and displays a music list that can be played in the second display area 300.

If a user moves the mobile terminal to the right as shown in FIG. 15(a), the gyro sensor 142 generates a gyro signal. The controller 180 detects motion information of the mobile terminal from the generated gyro signal. The controller 180 determines that the mobile terminal has moved to the right based on the detected motion information.

The controller 180 determines the gyro signal as a control signal and determines a display area which will be selected or controlled in response to the control signal. The controller 180 detects the motion direction of the mobile terminal and determines a display area corresponding to the detected motion information. As the mobile terminal has moved to the right, the controller 180 selects the second display area 300.

The controller 180 displays an indicator icon 305 in the selected second display area 300 as shown in FIG. 15(b). The user can check the selected display area through the indicator icon 305.

Next, the controller 180 controls the selected display area in response to a control signal corresponding to the gyro signal, as shown in FIG. 15(c). The controller 180 plays a piece of music (i.e., a highlighted item) of the music list displayed in the second display area 300. The controller 180 displays a music playback screen of a music playback application in the second display area 300.

Further, as shown in FIG. 16(a), a user may move the mobile terminal to the left. The gyro sensor 142 generates a gyro signal in response to the motion of the mobile terminal. The controller 180 detects motion information of the mobile terminal from the generated gyro signal.

The controller 180 that has detected the left motion of the mobile terminal selects the first display area 200, as shown in FIG. 16(b). The controller 180 displays the indicator icon 305 in the first display area 200. Next, the controller 180 displays the contents of a message (i.e., a highlighted item) of the list of received messages displayed in the first display area 200, as shown in FIG. 16(c).

In other words, the controller 180 controls a received message application in which an execution screen is displayed in the first display area 200 in response to an input control signal.

For another example, the controller 180 may select or control an application in which an execution screen is displayed in one of the first and second display areas in response to a movement velocity, a movement strength, the number of times of movement, a movement pattern, etc. of the mobile terminal or may change a display state of one of the first and second display areas.

The mobile terminal and the method of controlling the same according to the exemplary embodiments of the present invention are not limited to the above-described constructions and methods, but instead all or some of the embodiments may be selectively combined so that a variety of modifications are possible.

In accordance with the present invention, a mobile terminal which can manage a schedule using a map can be provided. Accordingly, a user can check a schedule stored in a schedule list even without checking a text-based schedule list. Further, a user can check a current position, traffic information, etc. through a map.

Meanwhile, the present invention may be implemented in the form of processor-readable codes in recording media which are readable by a processor included in a mobile terminal, such as a mobile station modem (MSM). The processor-readable recording media may include all kinds of recording devices in which processor-readable data is stored. The processor-readable recording media may include, for example, ROM, RAM, CD-ROM, magnetic tapes, floppy disks, and optical data storages and may also include carrier wave forms, such as transmission over the Internet. Furthermore, the processor-readable recording media may be stored and executed in the form of codes which are distributed into computer systems connected over a network and are readable by a processor in a distributed manner.

Although the preferred embodiment of the present invention has been described, the scope of the present invention is not limited by or to the embodiment as described above, and the scope of the present invention covers the equivalents which substantially fall within the embodiment of the present invention. Those skilled in the art will appreciate that various modifications are possible without departing from the spirit of the present invention.

What is claimed is:

1. A method of controlling a mobile terminal comprising at least first and second display areas, the mobile terminal operable in an open configuration and a closed configuration, the method comprising:
setting a display area corresponding to a movement type of the mobile terminal and a display effect for notifying a selected display area;
receiving a gyro signal from a gyro sensor in the mobile terminal indicating the mobile terminal is being rotated in a first direction;
selecting, via a controller of the mobile terminal, the first display area from among the at least first and second display areas that corresponds to a rotating direction of the mobile terminal;
receiving a gyro signal from the gyro sensor indicating the mobile terminal is maintaining a state in which it is rotated in the first direction;
performing an operation on the first display area based on the maintaining the state of the mobile terminal rotated in the first direction;
detecting information of a user input unit included in the mobile terminal; and
changing the selected first display area or controlling the operation in response to a control signal corresponding to the detected information of the user input unit and based on an assigned different priority to an operation related to the gyro sensor and an operation related to user input unit when the user input unit is manipulated while the mobile terminal is being rotated, wherein the setting the display area and the display effect comprises:

in response to selection of a setting menu, displaying a setting window for enabling a user to set up a movement type that can be input to the mobile terminal and a display area corresponding to the movement type; and displaying an effect setting window for enabling an indicator icon to be displayed in a selected display area or enabling the user to change at least one of a brightness, sharpness, and color of the selected display area, such that the user can identify which display area has been selected in response to a movement of the mobile terminal.

2. The method of claim 1, further comprising:

generating vibration in the first display area, displaying the indicator icon in the first display area, or changing the at least one of a brightness, sharpness, and color of the first display area to indicate the first display area is selected.

3. The method of claim 1, wherein the information of the user input unit includes at least one of whether the user input unit has been manipulated, a type, a manipulation velocity, a number of times of manipulation, and a manipulation pattern of the manipulated user input unit.

4. The method of claim 3, wherein the user input unit comprises at least one of a hard key, jog wheel, track ball, joystick, touch screen, touch pad, touch wheel, user input sensor, and soft key displayed in one of the at least first and second display areas.

5. The method of claim 4, wherein if the priority assigned to the user input unit is higher than the rotating of the mobile terminal, and if the touch wheel is manipulated, the method further comprises dragging a list displayed in the first display area, displaying an object corresponding to a highlighted item or an icon in the first display area, executing an application corresponding to a highlighted item or an icon in the first display area, displaying information or an icon of a displayed object in the first display area, or sequentially displaying objects included in a list in the first display area.

6. A mobile terminal operable in an open configuration and a closed configuration, comprising:

at least first and second display areas;
a gyro sensor; and
a controller configured to:
receive a gyro signal from a gyro sensor in the mobile terminal indicating the mobile terminal is being rotated in a first direction,
select the first display area from among the at least first and second display areas that corresponds to a rotation direction of the mobile terminal,
receive a gyro signal from the gyro sensor indicating the mobile terminal is maintaining a state in which it is rotated in the first direction,
perform an operation on the first display area based on the maintaining the state of the mobile terminal rotated in the first direction,
detect information of the user input unit, and
change the selected first display area or control the operation in response to a control signal corresponding to the detected information of the user input unit and based on an assigned different priority to an operation related to the gyro sensor and an operation related to the user input unit when the user input unit is manipulated while the mobile terminal is being rotated, wherein, in response to selection of a setting menu, the controller is configured to:

display a setting window for enabling a user to set up a movement type that can be input to the mobile terminal and a display area corresponding to the movement type, display an effect setting window for enabling an indicator icon to by displayed in a selected display area or enabling the user to change at least one of a brightness, sharpness, and color of the selected display area, such that the user can identify which display area has been selected in response to the movement of the mobile terminal, and set the display area corresponding to the movement type and a display effect for notifying a selected display area based on a user command input through the setting window and the effect setting window.

7. The mobile terminal of claim 6, wherein the controller generates vibration in the first display area, displays the indicator icon in the first display area, or changes the at least one of a brightness, sharpness, and color of the first display area to indicate the first display area has been selected.

8. The mobile terminal of claim 6, wherein the information of the user input unit includes at least one of whether the user input unit has been manipulated, a type, a manipulation velocity, a number of times of manipulation, and a manipulation pattern of the manipulated user input unit.

9. The mobile terminal of claim 8, wherein the user input unit comprises at least one of a hard key, jog wheel, track ball, joystick, touch screen, touch pad, touch wheel, user input sensor, and soft key displayed in one of the at least first and second display areas.

10. The mobile terminal of claim 9, wherein if the priority assigned to the user input is higher than the rotating of the mobile terminal, and if the touch wheel is manipulated, the controller drags a list displayed in the first display area, displays an object corresponding to a highlighted item or an icon in the first display area, executes an application corresponding to a highlighted item or an icon in the first display area, displays information or an icon of a displayed object in the first display area, or sequentially displays objects included in a list in the first display area.

* * * * *